(12) United States Patent
Warren et al.

(10) Patent No.: US 12,522,318 B2
(45) Date of Patent: Jan. 13, 2026

(54) SINGLE-SPROCKET SYSTEM FOR A BICYCLE TRAINER

(71) Applicant: Zwift, Inc., Long Beach, CA (US)

(72) Inventors: Gary Warren, London (GB); Meir Machlin, Tel Aviv (IL); Adrian Bennett, London (GB); Thomas Hargreaves, London (GB); Jonathan Heath, London (GB)

(73) Assignee: Zwift, Inc., Long Beach, CA (US)

( * ) Notice: Subject to any disclaimer, the term of this patent is extended or adjusted under 35 U.S.C. 154(b) by 0 days.

(21) Appl. No.: 18/084,809

(22) Filed: Dec. 20, 2022

(65) Prior Publication Data

US 2023/0213087 A1    Jul. 6, 2023

Related U.S. Application Data

(60) Provisional application No. 63/295,810, filed on Dec. 31, 2021.

(51) Int. Cl.
*B62M 9/06* (2006.01)
*A63B 69/16* (2006.01)
(Continued)

(52) U.S. Cl.
CPC .............. *B62M 9/06* (2013.01); *B62J 13/00* (2013.01); *B62J 13/06* (2013.01); *B62M 9/04* (2013.01);
(Continued)

(58) Field of Classification Search
CPC .... B62M 9/00; B62M 2009/007; B62M 9/04; B62M 9/06; B62M 9/105; B62M 9/136;
(Continued)

(56) References Cited

U.S. PATENT DOCUMENTS 655,943 A  *  8/1900  Williamson ............ F16H 55/30
                                                    474/164
877,820 A  *  1/1908  Badger ..................... F16H 7/18
                                                      74/609
(Continued)

FOREIGN PATENT DOCUMENTS

CN         2353652 Y  * 12/1999  ...... B62M 2009/007
CN     104260820 A  *  1/2015  .............. B62M 9/00
(Continued)

*Primary Examiner* — Anna M Momper
*Assistant Examiner* — Raveen J Dias
(74) *Attorney, Agent, or Firm* — SoCal IP Law Group LLP; Jonathan Pearce

(57) ABSTRACT

A single-sprocket system for integration into a bicycle trainer, the system including a sprocket having teeth about a perimeter of the sprocket, a first planar side, and a second planar side, wherein the teeth of the sprocket are configured to engage a chain of a bicycle mounted to the bicycle trainer. The system further includes a first chain guide adjacent the first planar side of the sprocket, wherein the first chain guide is configured to re-engage the teeth of the sprocket with the chain when the chain has become disengaged from the teeth of the sprocket towards the first planar side, and a second chain guide adjacent the second planar side of the sprocket, wherein the second chain guide is configured to re-engage the teeth of the sprocket with the chain when the chain has become disengaged from the teeth of the sprocket towards the second planar side.

21 Claims, 5 Drawing Sheets

(51) Int. Cl.
*B62J 13/00* (2006.01)
*B62J 13/06* (2006.01)
*B62M 9/00* (2006.01)
*B62M 9/04* (2006.01)
*B62M 9/10* (2006.01)
*B62M 9/126* (2010.01)
*B62M 9/128* (2010.01)
*F16H 7/18* (2006.01)
*F16H 7/22* (2006.01)
*B62M 9/136* (2010.01)
*B62M 9/138* (2010.01)

(52) U.S. Cl.
CPC ............ *B62M 9/126* (2013.01); *B62M 9/128* (2013.01); *F16H 7/18* (2013.01); *F16H 7/22* (2013.01); *A63B 69/16* (2013.01); *A63B 2069/164* (2013.01); *A63B 2069/165* (2013.01); *B62M 2009/007* (2013.01); *B62M 9/105* (2013.01); *B62M 9/136* (2013.01); *B62M 9/138* (2013.01)

(58) Field of Classification Search
CPC ...... B62M 9/138; B62M 9/126; B62M 9/128; F16H 7/18; F16H 2007/185; F16H 7/20; F16H 55/30; F16H 7/22; A63B 22/16; A63B 22/0605; A63B 23/0476; A63B 69/16; A63B 2069/161; A63B 2069/163; A63B 2069/164; A63B 2009/165; A63B 2069/166; A63B 2069/165; B62J 13/00; B62J 13/02; B62J 13/04; B62J 13/06

See application file for complete search history.

(56) References Cited

U.S. PATENT DOCUMENTS

| | | | | |
|---|---|---|---|---|
| 952,647 A * | 3/1910 | Sorensen | ............... | B62J 13/00 74/609 |
| 1,105,518 A * | 7/1914 | Irvin | ............... | F16H 55/30 305/44 |
| 1,181,175 A * | 5/1916 | Shapiro | ............... | F16H 7/18 474/151 |
| 1,636,327 A * | 7/1927 | Roe | ............... | B62J 13/00 474/144 |
| 1,937,304 A * | 11/1933 | Worrall | ............... | B65G 23/00 74/31 |
| 2,722,843 A * | 11/1955 | Edwards, Jr. | ............... | F16H 55/30 59/91 |
| 3,156,130 A * | 11/1964 | Gant | ............... | F16H 55/30 474/151 |
| 3,650,158 A * | 3/1972 | Van Huis | ............... | A01K 39/01 366/342 |
| 3,815,439 A * | 6/1974 | Tarutani | ............... | B62M 9/10 474/144 |
| 3,835,729 A * | 9/1974 | Tarutani | ............... | F16P 1/04 474/144 |
| 4,240,303 A * | 12/1980 | Mosley | ............... | F16H 57/04 474/151 |
| 4,261,214 A * | 4/1981 | Watanabe | ............... | B62M 9/00 474/151 |
| 4,380,445 A * | 4/1983 | Shimano | ............... | B62M 9/105 474/144 |
| 4,439,172 A * | 3/1984 | Segawa | ............... | B62M 9/105 74/447 |
| 4,475,894 A * | 10/1984 | Sugino | ............... | B62M 9/105 474/144 |
| 4,586,914 A * | 5/1986 | Nagano | ............... | B62M 9/105 474/160 |
| 4,741,724 A * | 5/1988 | Wang | ............... | B62M 9/105 474/160 |
| 4,798,565 A * | 1/1989 | Boyd | ............... | B62M 9/105 474/158 |
| 4,824,104 A * | 4/1989 | Bloch | ............... | A63B 21/015 188/134 |
| 4,925,183 A * | 5/1990 | Kim | ............... | A63B 69/16 482/61 |
| 5,003,840 A * | 4/1991 | Hinschlager | ............... | B62J 23/00 74/609 |
| 5,417,617 A * | 5/1995 | Milton | ............... | F16H 55/171 474/93 |
| 5,480,366 A * | 1/1996 | Harnden | ............... | A63B 69/16 482/61 |
| 5,667,449 A * | 9/1997 | Dalton | ............... | B62M 9/04 474/70 |
| 5,725,450 A * | 3/1998 | Huskey | ............... | B62M 9/16 474/134 |
| 5,890,980 A * | 4/1999 | Heyng | ............... | F16H 55/171 474/158 |
| 6,533,690 B2 * | 3/2003 | Barnett | ............... | B62M 9/138 474/140 |
| 6,588,110 B2 * | 7/2003 | Galster | ............... | F02B 63/02 474/151 |
| 6,945,917 B1 * | 9/2005 | Baatz | ............... | A63B 21/0051 482/57 |
| 7,569,001 B2 * | 8/2009 | Warner | ............... | B62M 1/10 482/57 |
| 10,561,562 B1 * | 2/2020 | Erb | ............... | A63B 24/0087 |
| 10,933,291 B2 * | 3/2021 | Papadopoulos | ............... | A63B 69/16 |
| 2002/0028719 A1 * | 3/2002 | Yamanaka | ............... | B62J 13/00 474/160 |
| 2002/0147064 A1 * | 10/2002 | Chen | ............... | B62M 9/00 474/158 |
| 2002/0160869 A1 * | 10/2002 | Barnett | ............... | B62M 9/138 474/144 |
| 2003/0060315 A1 * | 3/2003 | Jiang | ............... | F16H 7/18 474/134 |
| 2003/0060316 A1 * | 3/2003 | Jiang | ............... | B62M 9/16 74/134 |
| 2004/0147348 A1 * | 7/2004 | Yiu | ............... | F16H 55/30 474/96 |
| 2006/0058139 A1 * | 3/2006 | Fry | ............... | B62J 13/00 474/144 |
| 2006/0234840 A1 * | 10/2006 | Watson | ............... | A63B 22/0605 482/61 |
| 2007/0004564 A9 * | 1/2007 | Warner | ............... | A63B 22/0605 482/57 |
| 2009/0062049 A1 * | 3/2009 | Cranston | ............... | B62J 13/00 474/144 |
| 2012/0322621 A1 * | 12/2012 | Bingham, Jr | ............... | A63B 21/0088 482/8 |
| 2013/0143703 A1 * | 6/2013 | Schlumpf | ............... | F16H 55/30 474/152 |
| 2013/0150194 A1 * | 6/2013 | Preining | ............... | B62M 6/40 474/158 |
| 2013/0217527 A1 * | 8/2013 | Graziosi | ............... | B62M 9/16 474/140 |
| 2015/0080190 A1 * | 3/2015 | Kaan | ............... | A63B 21/00196 482/57 |
| 2016/0010730 A1 * | 1/2016 | Ziliak | ............... | F16H 55/36 474/152 |
| 2016/0051881 A1 * | 2/2016 | Colan | ............... | A63B 21/0051 482/61 |
| 2016/0053882 A1 * | 2/2016 | Watarai | ............... | F16H 55/30 474/152 |
| 2018/0229793 A1 * | 8/2018 | Cody | ............... | B62J 13/00 |
| 2019/0031285 A1 * | 1/2019 | Jang | ............... | B62M 21/00 |
| 2019/0176920 A1 * | 6/2019 | Cody | ............... | B62M 9/105 |
| 2020/0188757 A1 * | 6/2020 | Meyer | ............... | A63B 69/16 |
| 2020/0324858 A1 * | 10/2020 | Barefoot | ............... | B62M 9/00 |
| 2021/0094653 A1 * | 4/2021 | Kang | ............... | F16H 7/06 |
| 2021/0131550 A1 * | 5/2021 | Hall | ............... | F16C 3/02 |
| 2021/0197922 A1 * | 7/2021 | Durrani | ............... | B62M 9/00 |
| 2021/0277986 A1 * | 9/2021 | Hobbs | ............... | F16H 55/30 |
| 2022/0033033 A1 * | 2/2022 | Barefoot | ............... | B62M 9/00 |
| 2022/0054885 A1 * | 2/2022 | van der Kroft | ............... | A63B 22/0605 |
| 2022/0227442 A1 * | 7/2022 | Hastings | ............... | B62J 13/00 |

(56) References Cited

U.S. PATENT DOCUMENTS

2022/0371677 A1\* 11/2022 Karan ................... A63B 69/16
2023/0025376 A1\* 1/2023 Chalmers ............... A63B 69/16

FOREIGN PATENT DOCUMENTS

| CN | 114954772 A | \* | 8/2022 | ............. | B62M 9/04 |
| DE | 102012104847 A1 | \* | 12/2013 | ............. | B62M 9/02 |
| EP | 2003048 B1 | \* | 2/2013 | ............. | B62J 13/00 |
| FR | 2763857 A1 | \* | 12/1998 | ......... | A63B 22/0605 |
| KR | 100503597 B1 | \* | 7/2005 | ............. | B62M 9/08 |
| KR | 20130103269 A | \* | 9/2013 | ............. | F16H 7/08 |
| SU | 1199696 A1 | \* | 12/1985 | ............. | B62J 13/04 |
| SU | 1431785 A1 | \* | 10/1988 | ............. | A63B 69/16 |
| WO | WO-2014148899 A1 | \* | 9/2014 | ............. | B62J 13/04 |

\* cited by examiner

SINGLE-SPROCKET SYSTEM FOR A BICYCLE TRAINER

A portion of the disclosure of this patent document contains material which is subject to copyright protection. This patent document may show and/or describe matter which is or may become trade dress of the owner. The copyright and trade dress owner has no objection to the facsimile reproduction by anyone of the patent disclosure as it appears in the Patent and Trademark Office patent files or records, but otherwise reserves all copyright and trade dress rights whatsoever.

RELATED APPLICATION INFORMATION

This patent claims priority from the following provisional patent application:

U.S. Provisional Patent Appl. No. 63/295,810 filed Dec. 31, 2021, entitled "Single Sprocket Trainer System."

BACKGROUND

Field

This disclosure relates to bicycle trainer systems and, more particularly, to a single-sprocket trainer system for use with bicycle trainer systems.

Description of the Related Art

There exist various types of exercise devices, many of which provide resistance to increase the intensity of the exercise. For example, dedicated indoor cycles and road cycles fixed to training devices (so-called "trainers") enable a user to control or implement systems whereby resistance is added to the pedals by any number of methods to train the user to achieve an increase in endurance, power, and speed.

Some systems rely upon manual addition of resistance through gearing, the application of a fixed brake, or even wind-based resistance (e.g., blower-style flywheels on wheels of old-style exercise cycles). More complex systems began enabling computer control of electronic resistance devices in the 1980s and 1990s. These systems typically enabled users to ride through pre-programmed courses of simulated hills and flats and valleys with the associated increases and decreases in resistance controlled by a computer controller. Modernly, users can virtually experience these changes in terrain via a display that appears to show the user navigating through a particular course.

These electronic controlled resistance devices are often magnetic combined with a small or sometimes large flywheel. The most realistic feeling trainers and bicycles typically utilize large flywheels to simulate the mass of the rider and bike. Even more modern resistance devices rely almost exclusively on carefully controlled magnets. They do spin, so in some sense they can act as flywheels, but virtually all of the added resistance and momentum is simulated by software through electromagnetic application of current on the spinning axle.

ASPECTS OF THE DISCLOSURE

Non-limiting aspects of the disclosure are set out, but way of example only, in the following numbered clauses:

Clause 1. A single-sprocket system for integration into a bicycle trainer, the system comprising:

a sprocket having teeth about a perimeter of the sprocket, a first planar side, and a second planar side opposite the first planar side, wherein the teeth of the sprocket are configured to engage a chain of a bicycle mounted to the bicycle trainer;

a first chain guide adjacent the first planar side of the sprocket, wherein the first chain guide is configured to re-engage the teeth of the sprocket with the chain when the chain has become disengaged from the teeth of the sprocket towards the first planar side; and a second chain guide adjacent the second planar side of the sprocket, wherein the second chain guide is configured to re-engage the teeth of the sprocket with the chain when the chain has become disengaged from the teeth of the sprocket towards the second planar side.

Clause 2. The single-sprocket system of clause 1, wherein the first chain guide comprises a first oblique portion having a first oblique surface about a perimeter of the first oblique portion of the first chain guide, the first oblique surface at a first oblique angle to the sprocket, wherein the first oblique portion is configured to shift the chain to re-engage the teeth of the sprocket when the chain has become disengaged from the teeth of the sprocket.

Clause 3. The single-sprocket system of clause 2, wherein the first chain guide further comprises a first wall portion between the first oblique portion and the sprocket, the first wall portion comprising a first wall surface planar to the sprocket.

Clause 4. The single-sprocket system of clause 4, wherein the first wall portion is configured to form a portion of a gully to maintain engagement of the chain with the sprocket.

Clause 5. The single-sprocket system of any preceding clause, wherein the second chain guide comprises a second oblique portion having a second oblique surface about a perimeter of a second oblique portion of the second chain guide, the second oblique surface at a second oblique angle to the sprocket, wherein the second oblique portion is configured to shift the chain to re-engage the teeth of the sprocket when the chain has become disengaged from the teeth of the sprocket.

Clause 6. The single-sprocket system of clause 5, wherein the second chain guide further comprises a second wall portion between the second oblique portion and the sprocket, the second wall portion comprising a second wall surface planar to the sprocket.

Clause 7. The single-sprocket system of clause 6, wherein the second wall portion is configured to form a portion of a gully to maintain engagement of the chain with the sprocket.

Clause 8. The single-sprocket system of any preceding clause, further comprising a freehub, wherein the sprocket, the first chain guide, and the second chain guide are coupled to the freehub.

Clause 9. The single-sprocket system of clause 8 further comprising a locking ring coupled to the freehub.

Clause 10. The single-sprocket system of clause 9, wherein the locking ring is configured to maintain the position of the sprocket, the first chain guide, and the second chain guide with respect to each other.

Clause 11. The single-sprocket system of clause 10, wherein the locking ring is adjacent the first chain guide.

Clause 12. The single-sprocket system of any preceding clause, wherein the single-sprocket system is configured to re-engage the chain with the sprocket when the chain is disengaged from the sprocket by operation of a shifter on the bicycle.

Clause 13. The single-sprocket system of clause 12, wherein operation of the shifter engages a derailleur that moves the chain laterally with respect to the sprocket.

Clause 14. The single-sprocket system of any preceding clause, wherein the first chain guide and the second chain guide are configured to form a chain gully to receive the chain when the chain is engaged on the sprocket.

Clause 15. The single-sprocket system of any preceding clause, wherein the first chain guide, the second chain guide, and the sprocket are configured to receive a skewer to couple the single-sprocket system to the bicycle.

Clause 16. A single-sprocket system for integration into a bicycle trainer, the system comprising: a sprocket having teeth about a perimeter of the sprocket, a first planar side, and a second planar side opposite the first planar side, wherein the teeth of the sprocket are configured to engage a chain of a bicycle mounted to the bicycle trainer;
- a first chain guide adjacent the first planar side of the sprocket, wherein the first chain guide is configured to redirect the chain toward the teeth in response to movement of the chain off of the sprocket towards the first planar side; and
- a second chain guide adjacent the second planar side of the sprocket, wherein the second chain guide is configured to redirect the chain toward the teeth in response to movement of the chain off of the sprocket toward the second planar side.

Clause 17. The single-sprocket system of clause 16, wherein the first chain guide comprises a first oblique portion having a first oblique surface about a perimeter of the first oblique portion of the first chain guide, the first oblique surface at a first oblique angle to the sprocket, wherein the first oblique portion is configured to shift the chain to re-engage the teeth of the sprocket when the chain has become disengaged from the teeth of the sprocket.

Clause 18. The single-sprocket system of clause 16, wherein the second chain guide comprises a second oblique portion having a second oblique surface about a perimeter of a second oblique portion of the second chain guide, the second oblique surface at a second oblique angle to the sprocket, wherein the second oblique portion is configured to shift the chain to re-engage the teeth of the sprocket when the chain has become disengaged from the teeth of the sprocket.

Clause 19. The single-sprocket system of clause 16, 17 or 18 further comprising a freehub, wherein the sprocket, the first chain guide, and the second chain guide are coupled to the freehub, and a locking ring, wherein the locking ring is coupled to the freehub.

Clause 20. A single-sprocket system for integration into a bicycle trainer, the system comprising: a sprocket having teeth about a perimeter of the sprocket, a first planar side, and a second planar side opposite the first planar side, wherein the teeth of the sprocket are configured to engage a chain of a bicycle mounted to the bicycle trainer; and
- a chain guide adjacent the sprocket, wherein the chain guide is configured to redirect the chain toward the teeth of the sprocket in response to movement of the chain to either side of the sprocket.

Clause 21. The single-sprocket system of clause 20 wherein the chain guide comprises a first chain guide on the first planar side of the sprocket and a second chain guide on a second planar side of the sprocket.

Clause 22. The single-sprocket system of clause 21, wherein the first chain guide comprises a first oblique portion having a first oblique surface about a perimeter of the first oblique portion of the first chain guide, the first oblique surface at a first oblique angle to the sprocket, wherein the first oblique portion is configured to shift the chain to re-engage the teeth of the sprocket when the chain has become disengaged from the teeth of the sprocket.

Clause 23. The single-sprocket system of clause 22, wherein a line extending from the first oblique surface along the first oblique angle, when extended through the sprocket, would intersect teeth of the sprocket.

Clause 24. The single-sprocket system of any one of clauses 21 to 23, wherein the second chain guide comprises a second oblique portion having a second oblique surface about a perimeter of a second oblique portion of the second chain guide, the second oblique surface at a second oblique angle to the sprocket, wherein the second oblique portion is configured to shift the chain to re-engage the teeth of the sprocket when the chain has become disengaged from the teeth of the sprocket.

Clause 25. The single-sprocket system of clause 24, wherein a line extending from the second oblique surface along the second oblique angle, when extended through the sprocket, would intersect the teeth of the sprocket.

DETAILED DESCRIPTION

Figure 1:
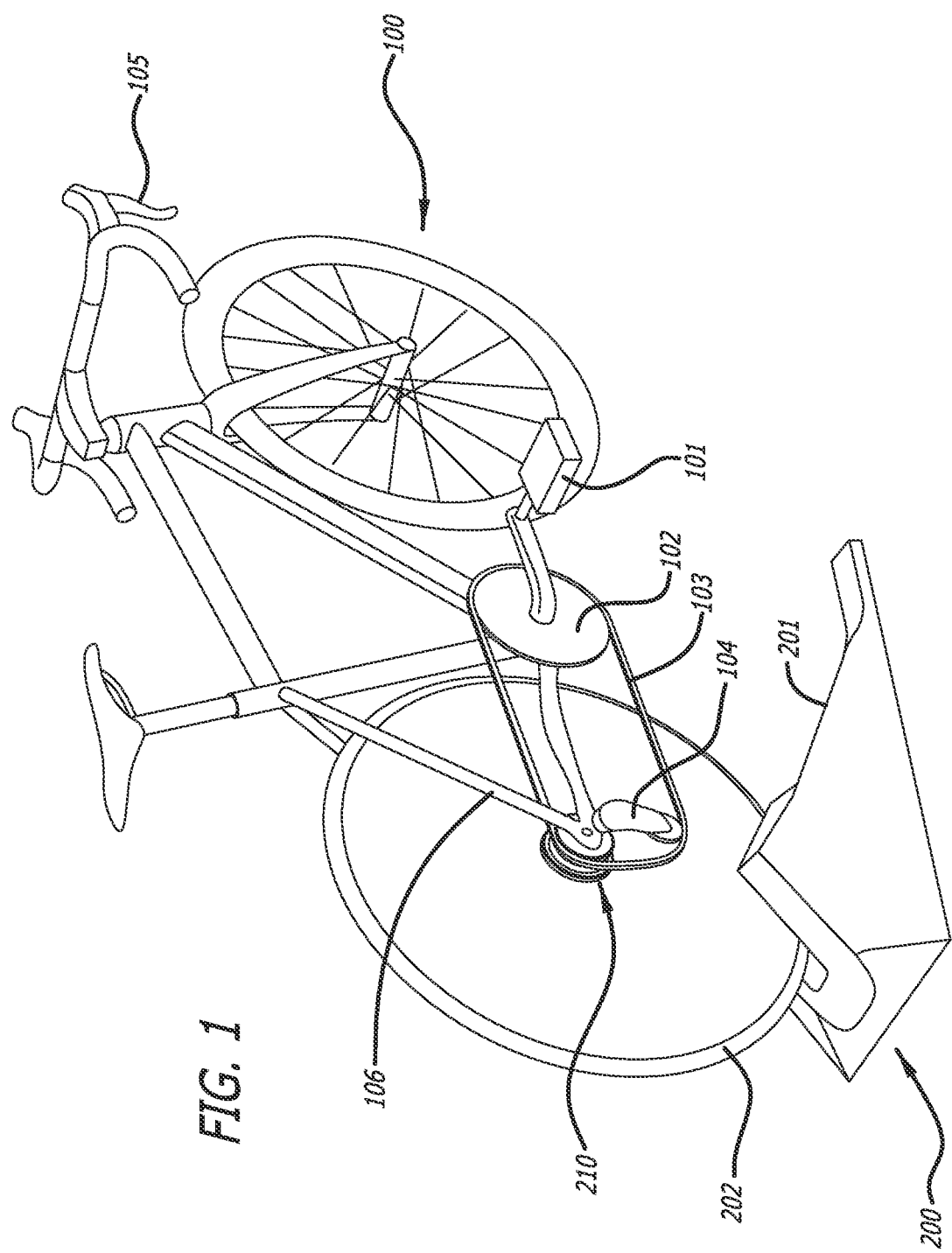
FIG. 1 is a perspective view of a system for exercise including a bicycle installed on a bicycle trainer with a single-sprocket system.

A bicycle trainer is a piece of equipment that enables a user to ride a bicycle while the bicycle remains stationary, for example, inside when riding conditions outside are not favorable. Direct drive smart bicycle trainers require a user to remove the rear wheel of the bicycle and place the bicycle on the trainer. A direct drive trainer includes a frame, a device to hold the bicycle securely, and a mechanism that provides resistance when the pedals are turned, such as a flywheel. The direct drive trainer acts as a replacement for the rear wheel, and is used with a matching cassette, so that the user can shift gears during the simulated ride. This creates a problem for both beginners and expert riders. Beginners struggle to understand what cassette type is needed, how to install the cassette on the bicycle trainer, which can be a time-consuming process, and how to fix the trainer to the back wheel of the cycle. Experts are more likely to use multiple bicycles, and therefore may have to settle on only one bike (or cassette) that works with the trainer, or constantly change the cassette. Further, households having more than one user, each of whom has their own bicycle, will also encounter the problem of having to either frequently install different cassettes to match each user's bicycle or settle on using just one bicycle that may not be the preferred bicycle of some of the users.

In addition, the act of engaging the derailleur to push the chain to a different sprocket (or cog) in the cassette to change gears can be a noisy experience indoors. It also creates unnecessary wear and tear of the bicycle parts in furtherance of a virtual ride, especially where it is not necessary for gears to change to simulate changes in resistance. Further, enthusiastic cyclists will often use their lower end bicycles indoors to avoid switching bicycles to ride indoors and avoid unnecessary wear on higher-end or better bicycles.

A single-speed sprocket system for virtual shifting, as discussed herein, is compatible with most direct drive trainers, and avoids the problems described above. A user can install a bicycle in a bicycle trainer with a single-speed sprocket system by sliding on the unit and tightening a single bolt with an Allen key. As discussed herein, a locking key may be employed to lock a single-speed sprocket system in place without the need for tools. Other quick-attachment mechanisms may also be employed in other cases. No special tools are required for installation, and the user does not need to navigate cassettes, chains, derailers, chain guides, or tensioners. In such a system, the sensation of shifting gears is provided entirely through an electronic adjustment in the resistance of the flywheel. The single-speed sprocket features a gully and guide design that keeps the chain aligned and prevents the chain from skipping out of position should a user engage the bicycle's physical shifters and, thus, the derailleur. All shifting takes place virtually with the chain always remaining on the single sprocket which reduces noise, is compatible with all bicycles, and provides the optimal digital shifting experience.

Virtual shifting may be provided in accordance with the patent application number U.S. Ser. No. 17/567,072 entitled "Virtual Shifting for Exercise Devices" describing that functionality and those systems by the same inventors and assigned to the same assignee.

FIG. 1 is a perspective view of a system for exercise including a bicycle 100 installed on a bicycle trainer 200 with a single-sprocket system 210. The bicycle 100 includes a frame 106 coupled to a crank 102 that engages a chain 103. For outdoor use of the bicycle 100, the chain 103 would typically be coupled to a cassette with multiple sprockets that is coupled to the rear wheel of the bicycle (not shown). The multiple sprockets allow for different gearing of the bicycle when the chain 103 is moved from one sprocket to another. The chain 103 can be moved between sprockets in a typical cassette via the derailleur 104, that is activated by physical shifters 105. The derailleur 104, when activated via the bicycle's physical shifters 105, would move the chain from one sprocket to another to either downshift or upshift the bicycle 100. A user drives the pedals 101 that in turn drive the crank 102, which in turn drives the chain 103. The chain 103 drives whichever one of the sprockets on which the chain 103 is engaged, which in turn drives the rear wheel of the bicycle to achieve movement of the bicycle 100.

When the bicycle 100 is installed on the bicycle trainer 200, the chain 103 is coupled to a flywheel 202 via the single-sprocket system 210. When the bicycle trainer 200 offers virtual shifting such that shifting is achieved virtually through regulation (e.g., electronically) by a motor controlling the difficulty the user experiences to rotate the flywheel 202, the derailleur 104 may become unnecessary for operation of the bicycle trainer 200. Further, there is only a single sprocket so the derailleur 104 cannot be used to move the chain 103 between sprockets as there are no other sprockets to which to move the chain. However, a typical user is accustomed to using the physical shifters 105, and thus the derailleur 104, to shift gears when navigating over changing terrain when the bicycle is being operated outside on a physical course. Further, the user may desire to move the derailleur to a known position (e.g., the smallest sprocket) so that the chain can be put back on the correct sprocket when the trainer is removed and the back wheel is reinstalled. Thus, while using the bicycle 100 with a bicycle trainer 200 on a virtual course that shows changing terrain, a user may attempt to operate the physical shifters 105, and thus the derailleur 104, to shift gears, forgetting that gear shifting is actually achieved via software changing the resistance of the flywheel 202. In some cases, auto-shifting by software may emulate shifting behavior, or hand controllers (or other sensors on the physical derailer shifters 105) may manually operate a "virtual" shift in software or both. However, the accidental physical gear shifting will still operate to attempt to move the chain from the single sprocket when there are no other sprockets onto which the chain may be moved. Thus, the single-sprocket system 210 is configured to prevent the chain 103 from disengaging from the single-sprocket system 210 when the user attempts to physically shift gears as discussed more fully below.

Figure 2:
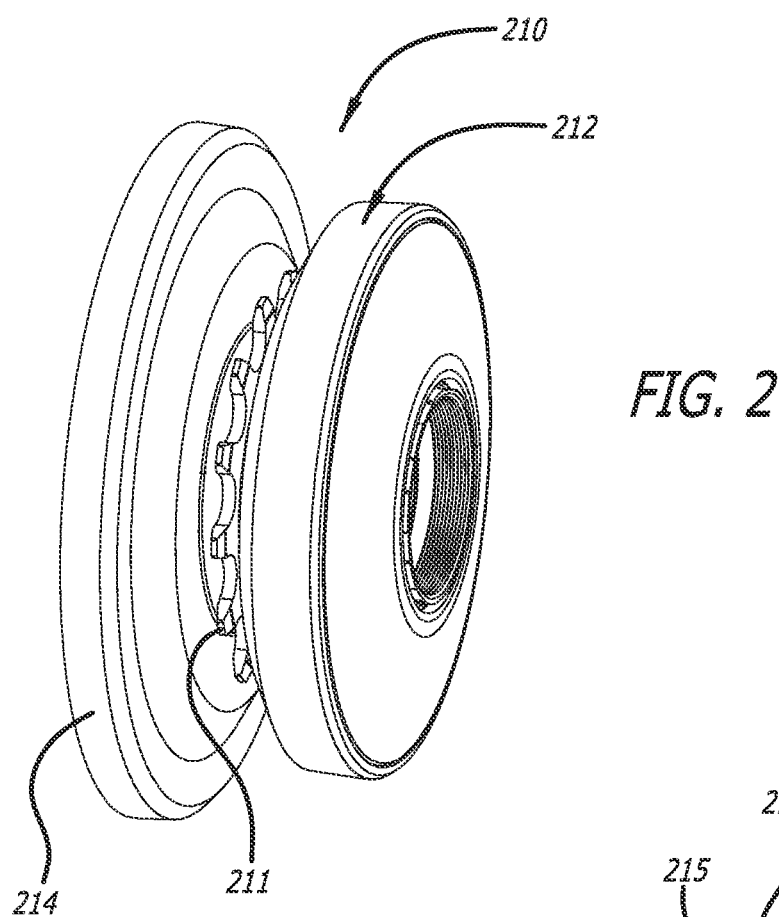
FIG. 2 is a perspective view of an example of a single-sprocket system for a bicycle trainer.
Figure 3:
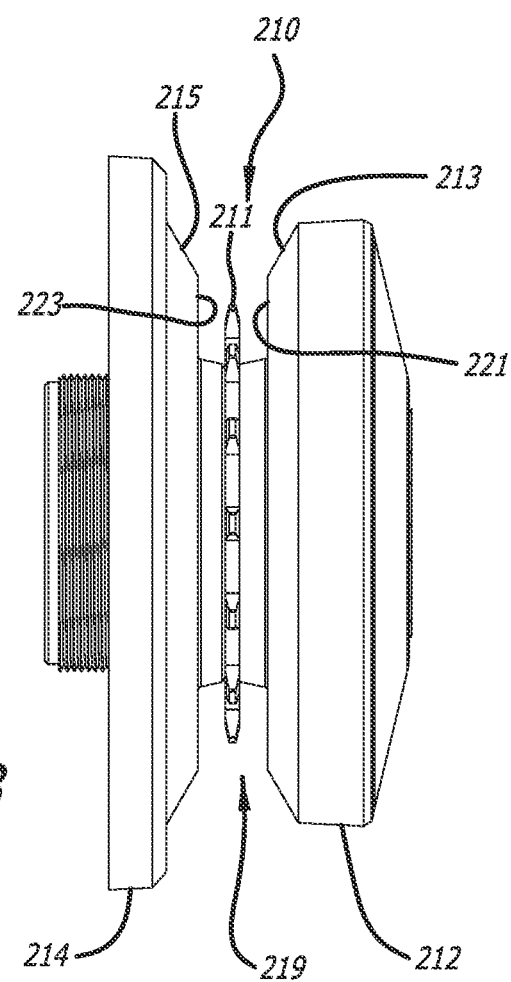
FIG. 3 is a plan view of the single-sprocket system of FIG. 2.
Figure 4:
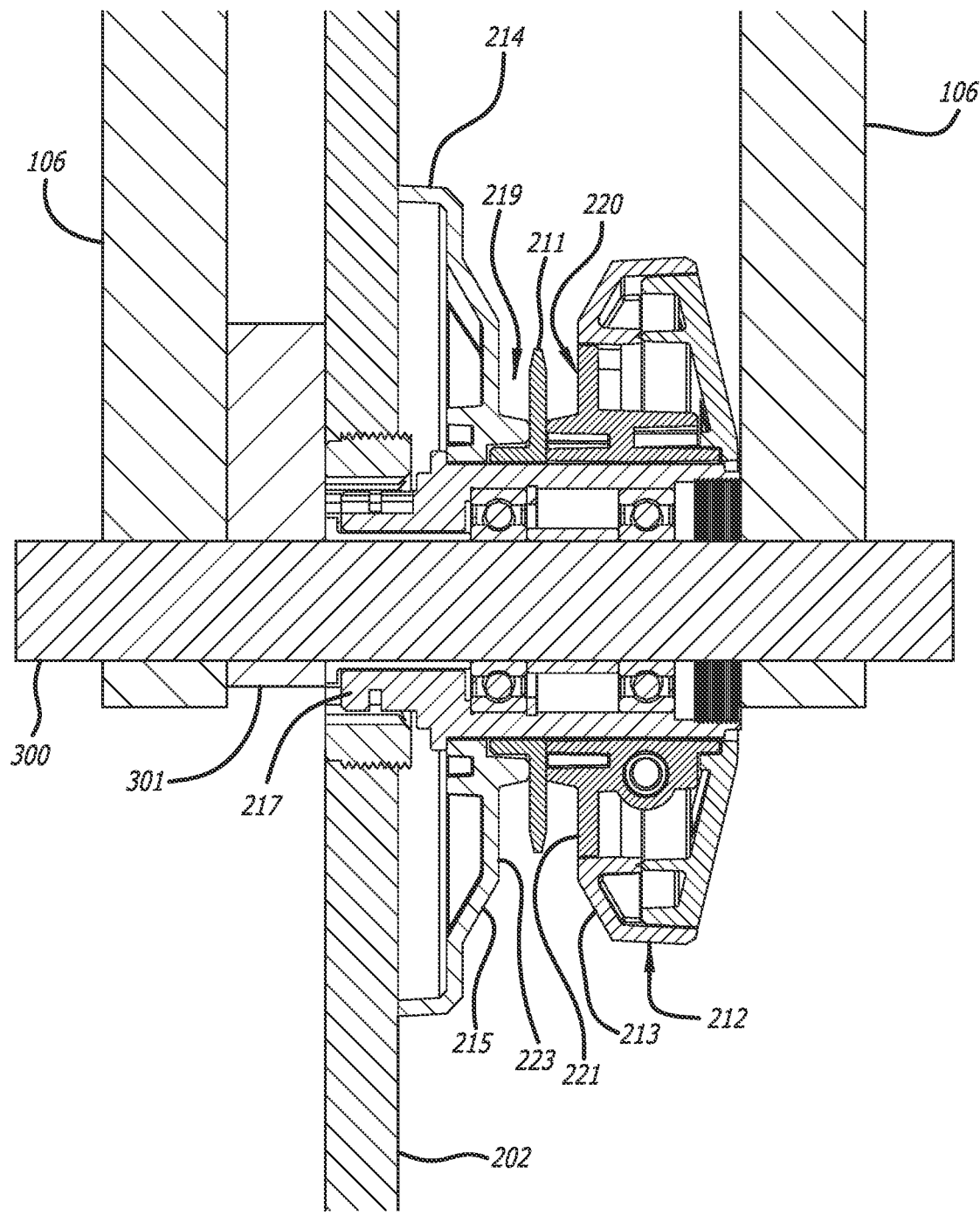
FIG. 4 is a cross-sectional view of the single-sprocket system of FIG. 2 as a part of a bicycle trainer with a bicycle installed.
Figure 5:
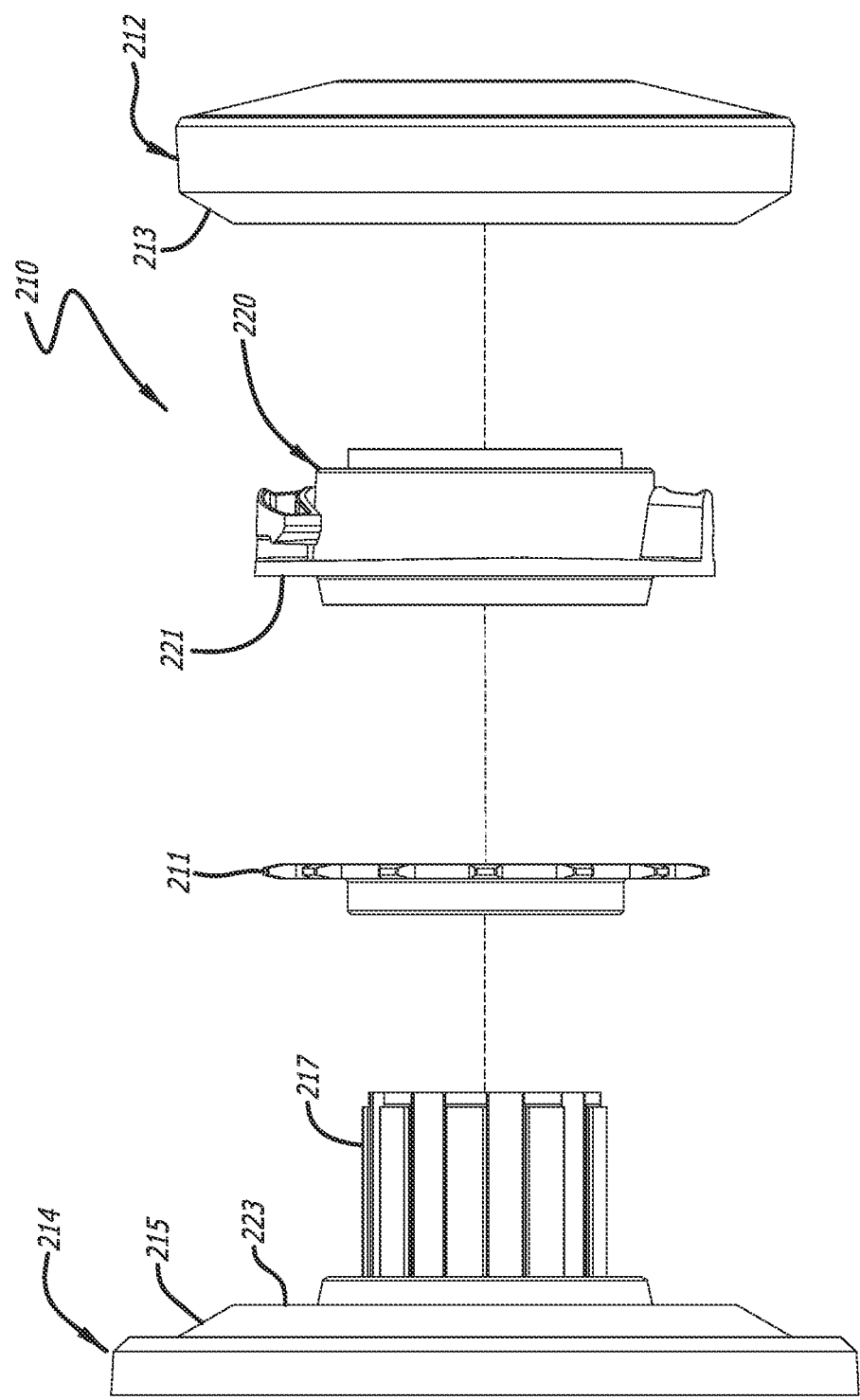
FIG. 5 is an exploded view of the single-sprocket system of FIG. 2.

FIG. 2 is a perspective view of the single-sprocket system 210, and FIG. 3 is a plan view of the single-sprocket system 210. FIG. 4 is a cross-sectional view of the single-sprocket system 210 as a part of a bicycle trainer 200 with a bicycle 100 installed. FIG. 5 is an exploded view of the single-sprocket system 210. The single-sprocket system 210 includes a sprocket 211 having teeth about a perimeter of the sprocket, a first planar side, and a second planar side opposite the first planar side. The sprocket 211 is typically formed of metal, such as stainless steel, but can be formed of another other suitable material. In one example, a diameter of the sprocket can be in a range from 42 mm to 210 mm, and in one example can have a diameter of 63 mm. In one example, the sprocket can have between 9 and 50 teeth, and in one example can have 14 teeth. The system is preferably formed in components or may be manufactured as a single piece.

In other examples, the single-sprocket system can include multiple sprockets, such as two or more sprockets.

The single-sprocket system 210 also includes a first chain guide 212 adjacent the first planar side of the sprocket 211. The first chain guide 212 may have a rotational (or circular) symmetry, and may for example be disc-shaped. In one example, the first chain guide 212 can have a diameter in a range from 50 mm to 150 mm, and in one example can have a diameter of 85 mm. In one example, the first chain guide can have a thickness in a range from 8 mm to 20 mm. The first chain guide 212 has a first oblique portion having a first oblique surface 213 proximal to the sprocket 211. The first oblique surface 213 is at an oblique angle to the sprocket 211, with oblique angle meaning neither perpendicular nor parallel herein. In other embodiments, the first oblique surface 213 can instead be a perpendicular to the sprocket 211 or parallel to the sprocket 211. In one example, the first oblique surface 213 can be at an angle between greater than 0 degrees (i.e., vertical) and 70 degrees to the sprocket 211, such as an angle from 10 degrees to 60 degrees, an angle from 20 degrees to 50 degrees, or 30 degrees, and the first oblique surface 213 can extend axially a length of between 2 mm and 10 mm, such as 4.5 mm. In one example, the first chain guide 212 can be configured such that an angle of the first oblique surface 213 to the sprocket 211 is such that if the first oblique surface 213 were extended to the sprocket 211, the first oblique surface 213 would insect the sprocket 211 between an outer diameter of the sprocket 211 and a base of the teeth of the sprocket 211. In other words, the angle of the first oblique surface 213 is such that a line extending along this angle would intersect the teeth of the sprocket 211. The first chain guide 212 can be formed of any suitably durable material. The first chain guide 212 can be formed from one or more monolithic pieces. For example, the material of the first oblique portion of the first chain guide 214 should be sturdy enough to resist any abrasion by the chain 103, and slippery enough that the chain 103 can move across the first oblique portion. For example, the first chain guide 212 can be formed of plastic, of aluminum or steel.

The single-sprocket system 210 also includes a second chain guide 214 adjacent the second planar side of the sprocket 211. The second chain guide 214 may have a rotational (or circular) symmetry, and may for example be disc-shaped. In one example, the second chain guide 214 can have a diameter in a range from 50 mm to 150 mm, and a thickness in a range from 8 mm to 20 mm. In one example the second chain guide 214 can have a diameter larger than a diameter of the first chain guide 212. The second chain guide 214 has a second oblique portion having a second oblique surface 215 proximal to the sprocket 211. The second oblique surface 215 is at an oblique angle to the sprocket 211. In other embodiments, the second oblique surface 215 can instead be a perpendicular to the sprocket 211 or parallel to the sprocket 211. In one example, the second oblique surface 215 can be at an angle between greater than 0 degrees (i.e., vertical) and 70 degrees to the sprocket 211, such as an angle from 10 degrees to 60 degrees, an angle from 20 degrees to 50 degrees, or 30 degrees, and the second oblique surface 215 can extend axially a length of between 2 mm and 10 mm, such as 4.5 mm. In one example, the second chain guide 214 can be configured such that an angle of the second oblique surface 215 to the sprocket 211 is such that if the second oblique surface 215 were extended to the sprocket 211, the second oblique surface 215 would insect the sprocket 211 between an outer diameter of the sprocket 211 and a base of the teeth of the sprocket 211. In other words, the angle of the second oblique surface 215 is such that a line extending along this angle would intersect the teeth of the sprocket 211. The second chain guide 214 can be formed of any suitably durable and slippery material. The second chain guide 214 can be formed from one or more monolithic pieces. For example, the material of the second oblique portion of the second chain guide 214 should be sturdy enough to resist any abrasion by the chain 103, and slippery enough that the chain 103 can move across the second oblique portion. In one example, the second chain guide 214 can be formed plastic, aluminum or steel.

In other examples, one or both of the first oblique surface 213 and the second oblique surface 215 can either be smooth or have a texture that is not flat or smooth, such as a texture with bumps or recesses. Further, though described as oblique, the first and second chain guides may have entire vertical surfaces or merely raised surfaces or merely raised or oblique portions, not entirely encompassing the circumference of the sprocket 211.

The sprocket 211 is positioned between the first chain guide 212 and the second chain guide 214. The sprocket 211, the first chain guide 212, and the second chain guide 214 are positioned relative to each other so that the chain 103 (not shown in FIGS. 2, 3, 4, and 5) engages the teeth of the sprocket 211. Further, the sprocket 211, the first chain guide 212, and the second chain guide 214 are positioned relative to each other so that when the chain 103 is disengaged from the teeth of the sprocket 211, e.g., by action of the derailleur 104 (not shown in FIGS. 2, 3, 4, and 5), either the first oblique surface 213 or the second oblique surface cause the chain 103 to re-engage the teeth of the sprocket 211. For example, if the derailleur 104 moves the chain 103 towards the first chain guide 212, the chain 103 will press against the first oblique surface 213. Due to the oblique angle of the first oblique surface 213, the chain 103 will slide along the first oblique surface 213 such that the chain 103 re-engages the teeth of the sprocket 211. Likewise, if the derailleur 104 moves the chain 103 towards the second chain guide 214, the chain 103 will press against the second oblique surface 215. Due to the oblique angle of the second oblique surface 215, the chain 103 will slide along the second oblique surface 213 such that the chain 103 re-engages the teeth of the sprocket 211.

In one example, the first chain guide 212, and the second chain guide 214 are configured to individually form portions of a gully 219 that additionally encourages the chain 103 to be engaged with the teeth of the sprocket 211. When the first chain guide 212 and the second chain guide 214 are positioned on either side of the sprocket 211, the gully 219 is formed by the first chain guide 212 and the second chain guide 214. Dimensions of the gully 219 are optimized to seat the chain 103 about the sprocket 211, so that the teeth of the sprocket 211 engage the chain 103. For example, the first chain guide 212 includes a first wall portion with a first wall surface 221 that is planar to the sprocket 211, and the second chain guide 214 includes a second wall portion with a second wall surface 223 that is planar to the sprocket 211. In one example, a length of the first wall surface 221 and a length of the second wall surface 223 extend at least as high as an outer diameter of the sprocket 211. In one example, the second wall surface 223 has a diameter of about 70 mm. The first wall surface 221 and the second wall surface 223 are positioned a distance from the sprocket 211 that is suitable to accommodate engagement of the chain 103 with the sprocket 211. Thus, a width of the gully 219 is slightly wider than a width of the chain 103. For example, a distance between the first wall surface 221 and the sprocket 211 can be in a range from 3 mm to 7 mm, such as 4.15 mm, and a distance between the second wall surface 223 and the sprocket 211 can be in a range from 3 mm to 7 mm, such as 4.15 mm.

In other examples, the sprocket 211, the first chain guide 212, and the second chain guide 214 are configured to engage a support component such as a freehub 217, as shown in FIG. 5. The freehub 217 is coupled to the flywheel 202 and allows the user of the bicycle 100 to "coast", e.g., for the flywheel 202 to continue turning while the user maintains the pedals 101 of the bicycle 100 in a stationary position. Other support components may not include a coasting or freewheeling functionality. The examples herein use a freehub which is a common support component, but the same teachings and techniques apply equally to other types of support components. For example, the sprocket 211, the first chain guide 212, and the second chain guide 214 have a central opening configured to engage splines of the freehub 217, so that each of the sprocket 211, the first chain guide 212, and the second chain guide 214 can be installed about the freehub 217. The sprocket 211, the first chain guide 212, the second chain guide 214 rotate when the user moves the pedals 101 of the bicycle 100, and the freehub 217 thus rotates the flywheel 202. However, the sprocket 211, the first chain guide 212, and the second chain guide 214 do not rotate when the user coasts, and the freehub 217 allows the flywheel 202 to continue to rotate via an internal ratchet system (not shown). In some examples, the first and second chain guides 212 and 214 and the freehub 217 may be connected so that the first and second chain guides 212 and 214 are not rotating with the sprocket 211.

The frame 106 of the bicycle 100 can be mounted to the bicycle trainer 200 using different techniques such as a clamp holding an axle (wheel off or wheel on) within the trainer, a custom axle inserted through the axle mount on a typical bicycle frame, a trainer-specific indoor cycle frame mounted to a trainer, or the frame 106 may itself be intended to be used as an indoor bike with a trainer or resistance device mounted thereto, or an axle may be inserted through the wheel or trainer, for example, via a through-axle or skewer 300. The through-axle or skewer 300 can extend through a central opening in the freehub 217 and the flywheel 202, and through openings in the bicycle frame 106, as can be seen in FIG. 4. Further, a spacer 301 may be used to maintain a proper spacing and orientation between portions of the frame 106 and the bicycle trainer 200. The spacer 301 can be selected to have dimensions suitable for a particular bicycle 100, depending on dimensions of the sprocket 211, the bicycle trainer 200, and the bicycle frame 106, since different bicycles can have different frame dimensions. The spacer 301 can be formed of any suitable material, such as plastic or metal. The through-axle or skewer 300 can be fastened in place by any suitable means (not shown). For example, the through-axle or skewer 300 can have fittings on one or both ends that screw into place, so that each portion of the bicycle frame 106 is compressed against the spacer 301 and the first chain guide 212, respectively, to maintain orientation via a friction fit. In another example, the through-axle or skewer 300 can be fastened to the bicycle 106 and the bicycle trainer 200 via a quick-release mechanism operated via lever.

In one example, the first chain guide 212 can include an insert 220. The insert 220 may be used to clamp the sprocket 211 in place axially and help to prevent the chain 103 from falling off the sprocket 211. The rest of the first chain guide 212 can be attached to the insert 220 by any suitable means, such as a friction fit, a snap fit, a twist lock, or interlocking threads. The insert 220 can be formed of any suitable material, such as plastic or metal. In another example, the insert 220 may be incorporated into the first chain guide 212, such that they are a monolithic structure.

Figure 6:
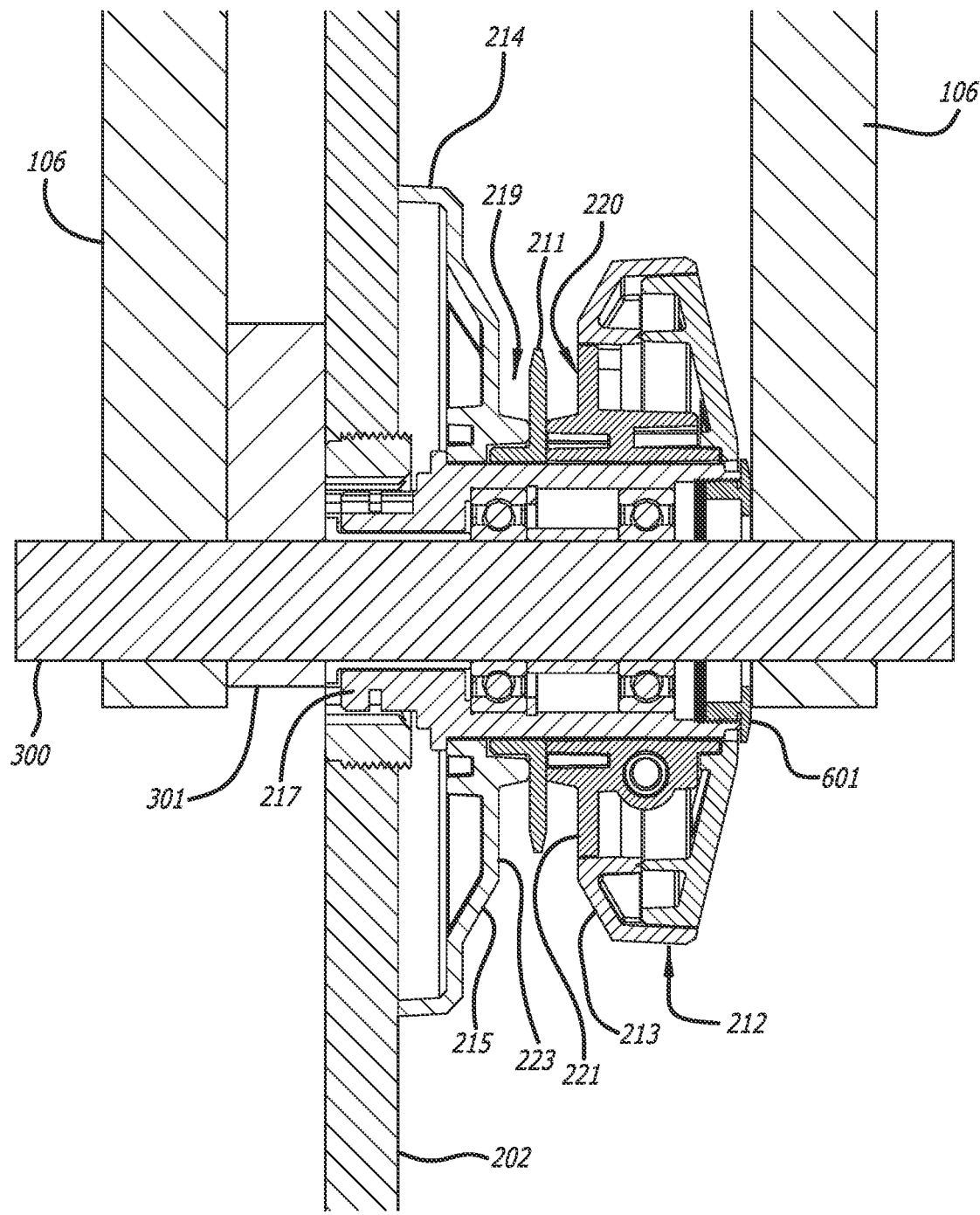
FIG. 6 is a cross-sectional view of another example of a single-sprocket system as a part of a bicycle trainer with a bicycle installed.

FIG. 6 is a cross-sectional view of a single-sprocket system 210 that includes a locking ring 601 as a part of a bicycle trainer 200 with a bicycle 100 installed. The locking ring 601 is configured to maintain the position of the sprocket 211, the first chain guide 212, and the second chain guide 214 with respect to each other. In one example, the locking ring 601 has outer threads that engage inner threads of the freehub 217, such that the locking ring 601 can be screwed onto the freehub 217 after the second chain guide 214, sprocket 211, and first chain guide 212 have been mounted sequentially on the freehub 217. Screwing the locking ring 601 onto the freehub 217 will prevent the second chain guide 214, sprocket 211, and first chain guide 212 from moving with respect to each other, particularly when the derailleur 104 is engaged such that the chain 103 pushes against either the first chain guide 212 or the second chain guide 214. In another example, the locking ring 601 can have a flange opposite the freehub 217 to facilitate screwing the locking ring 601 into the freehub 217 and stop the locking ring 601 from screwing further into the freehub 217 once the locking ring 601 has sufficiently engaged the freehub 217. In yet another example, the locking ring can be adjacent the first chain guide 212. The locking ring 601 can be formed of any suitable material, such as metal or plastic. The locking ring 601 can have any suitable dimensions for engagement of the freehub 217. For example, the threaded portion of the locking ring 601 can have a diameter in a range from 0.75 inches to 2 inches, such as 1.2 inches with 24 threads per inch, and the threaded portion can have a length in a range of 3 mm to 10 mm, such as 5 mm.

All dimensions given above are example, and each item may be configured to have different dimensions that are suitable for achieving desired functionality of the item.

Closing Comments

Throughout this description, the embodiments and examples shown should be considered as illustrative examples, rather than limitations on the apparatus and procedures disclosed or claimed. Although many of the examples presented herein involve specific combinations of method acts or system elements, it should be understood that those acts and those elements may be combined in other ways to accomplish the same objectives. With regard to flowcharts, additional and fewer steps may be taken, and the steps as shown may be combined or further refined to achieve the methods described herein. Acts, elements and features discussed only in connection with one embodiment are not intended to be excluded from a similar role in other embodiments.

As used herein, "plurality" means two or more. As used herein, a "set" of items may include one or more of such items. As used herein, whether in the written description or the claims, the terms "comprising", "including", "carrying", "having", "containing", "involving", and the like are to be understood to be open-ended, i.e., to mean including but not limited to. Only the transitional phrases "consisting of" and "consisting essentially of", respectively, are closed or semi-closed transitional phrases with respect to claims. Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements. As used herein, "and/or" means that the listed items are alternatives, but the alternatives also include any combination of the listed items.

It is claimed:

1. A single-sprocket system for integration into a bicycle trainer, the single-sprocket system comprising:
   a sprocket having teeth about a perimeter of the sprocket, a first planar side, and a second planar side opposite the first planar side, wherein the teeth of the sprocket are configured to engage a chain which may be used to couple a bicycle to the bicycle trainer;
   a first chain guide adjacent the first planar side of the sprocket, wherein the first chain guide is for re-engaging the teeth of the sprocket with the chain when the chain has become disengaged from the teeth of the sprocket towards the first planar side;
   a second chain guide adjacent the second planar side of the sprocket, wherein the second chain guide is for re-engaging the teeth of the sprocket with the chain when the chain has become disengaged from the teeth of the sprocket towards the second planar side; and an insert provided partially within the first chain guide and configured to hold the sprocket in position on an axle of the bicycle trainer; wherein the first chain guide comprises a first oblique portion having a first oblique surface about a perimeter of the first oblique portion of the first chain guide, the first oblique surface at least the height of the teeth of the sprocket at a first oblique angle to the sprocket, wherein the first oblique portion shifts the chain to re-engage the teeth of the sprocket when the chain has become disengaged from the teeth of the sprocket.

2. The single-sprocket system of claim 1, wherein the second chain guide comprises a second oblique portion having a second oblique surface about a perimeter of the second oblique portion of the second chain guide, the second oblique surface at a second oblique angle to the sprocket, wherein the second oblique portion is for shifting the chain to re-engage the teeth of the sprocket when the chain has become disengaged from the teeth of the sprocket; and wherein the first oblique angle and the second oblique angle are fixed angles of between 1 and 70 degrees.

3. The single-sprocket system of claim 2, wherein the first chain guide further comprises a first wall portion between the first oblique portion and the sprocket, the first wall portion comprising a first wall surface parallel to the sprocket.

4. The single-sprocket system of claim 3, wherein the first wall portion is configured to form a portion of a gully for maintaining engagement of the chain with the sprocket.

5. The single-sprocket system of any of claim 2, wherein the second chain guide further comprises a second wall portion between the second oblique portion and the sprocket, the second wall portion comprising a second wall surface parallel to the sprocket.

6. The single-sprocket system of claim 5, wherein the second wall portion is configured to form a portion of a gully for maintaining engagement of the chain with the sprocket.

7. The single-sprocket system of claim 1 further comprising a freehub, wherein the sprocket, the first chain guide, and the second chain guide are coupled to the freehub.

8. The single-sprocket system of claim 7 further comprising a locking ring coupled to the freehub.

9. The single-sprocket system of claim 8, wherein the locking ring is configured to maintain the position of the sprocket, the first chain guide, and the second chain guide with respect to each other.

10. The single-sprocket system of claim 9, wherein the locking ring is adjacent the first chain guide.

11. The single-sprocket system of claim 1, wherein the single-sprocket system is for re-engaging the chain with the sprocket when the chain is disengaged from the sprocket in response to operation of a shifter on the bicycle.

12. The single-sprocket system of claim 11, wherein operation of the shifter causes movement of a derailleur on the bicycle that moves the chain laterally with respect to the sprocket.

13. The single-sprocket system of claim 1, wherein the first chain guide and the second chain guide are configured to form a chain gully for receiving the chain when the chain is engaged on the sprocket.

14. The single-sprocket system of claim 1, wherein the first chain guide, the second chain guide, and the sprocket are for receiving a skewer to couple the single-sprocket system to the bicycle.

15. A single-sprocket system for integration into a bicycle trainer, the single-sprocket system comprising:

a sprocket having teeth about a perimeter of the sprocket, a first planar side, and a second planar side opposite the first planar side, wherein the teeth of the sprocket are configured to engage a chain which may be used to couple a bicycle to the bicycle trainer;

a first chain guide adjacent the first planar side of the sprocket, wherein the first chain guide is configured to redirect the chain toward the teeth in response to movement of the chain off of the sprocket towards the first planar side;

a second chain guide adjacent the second planar side of the sprocket, wherein the second chain guide is configured to redirect the chain toward the teeth in response to movement of the chain off of the sprocket towards the second planar side; and an insert provided partially within the first chain guide and configured to hold the sprocket in position on an axle of the bicycle trainer; wherein the first chain guide comprises a first oblique portion having a first oblique surface about a perimeter of the first oblique portion of the first chain guide, the first oblique surface at least the height of the teeth of the sprocket at a first oblique angle to the sprocket, wherein the first oblique portion is configured to shift the chain to re-engage the teeth of the sprocket when the chain has become disengaged from the teeth of the sprocket.

16. The single-sprocket system of claim 15, the second chain guide comprises a second oblique portion having a second oblique surface about a perimeter of a second oblique portion of the second chain guide, the second oblique surface at the second oblique angle to the sprocket, wherein the second oblique portion is configured to shift the chain to re-engage the teeth of the sprocket when the chain has become disengaged from the teeth of the sprocket; and the first oblique angle and the second oblique angle are fixed angles of between 10 and 60 degrees.

17. The single-sprocket system of claim 16 further comprising a freehub, wherein the sprocket, the first chain guide, and the second chain guide are coupled to the freehub, and a locking ring, wherein the locking ring is coupled to the freehub.

18. A single-sprocket system for integration into a bicycle trainer, the single-sprocket system comprising:

a sprocket having teeth about a perimeter of the sprocket, a first planar side, and a second planar side opposite the first planar side, wherein the teeth of the sprocket are configured to engage a chain which may be used to couple a bicycle to the bicycle trainer; a chain guide adjacent the sprocket, wherein the chain guide is configured to redirect the chain toward the teeth of the sprocket in response to movement of the chain to either side of the sprocket; and an insert provided partially within the chain guide and configured to hold the sprocket in position on an axle of the bicycle trainer; wherein the chain guide comprises a first oblique portion on the first planar side having a first oblique surface at least the height of the teeth of the sprocket about a perimeter of the first oblique portion of the chain guide, the first oblique surface at a first oblique angle to the sprocket, wherein the first oblique portion is configured to shift the chain to re-engage the teeth of the sprocket when the chain has become disengaged from the teeth of the sprocket.

19. The single-sprocket system of claim 18, wherein the chain guide comprises a first chain guide on the first planar side of the sprocket and a second chain guide on a second planar side of the sprocket.

20. The single-sprocket system of claim 19, wherein the second chain guide comprises a second oblique portion having a second oblique surface about a perimeter of the second oblique portion of the second chain guide, the second oblique surface at a second oblique angle to the sprocket, wherein the second oblique portion is configured to shift the chain to re-engage the teeth of the sprocket when the chain has become disengaged from the teeth of the sprocket; and the first oblique angle and the second oblique angle are fixed angles of between 10 and 60 degrees.

21. The single-sprocket system of claim 20, wherein a line extending from the first oblique surface along the first oblique angle, when extended through the sprocket, would intersect teeth of the sprocket, and wherein a line extending from the second oblique surface along the second oblique angle, when extended through the sprocket, would intersect the teeth of the sprocket.

* * * * *